US011503838B2

(12) United States Patent
Park et al.

(10) Patent No.: US 11,503,838 B2
(45) Date of Patent: Nov. 22, 2022

(54) METHOD FOR MANUFACTURING EDIBLE OIL, AND EDIBLE OIL AND FOOD EACH MANUFACTURED USING SAME

(71) Applicant: QUEENSBUCKET. CO., LTD., Gyeongsan-si (KR)

(72) Inventors: Jeong Yong Park, Seoul (KR); Yeo Sook Lim, Seoul (KR); Hyeong Nam Jung, Seoul (KR)

(73) Assignee: Queensbucket. Co., Ltd., Gyeongsan-si (KR)

( * ) Notice: Subject to any disclaimer, the term of this patent is extended or adjusted under 35 U.S.C. 154(b) by 487 days.

(21) Appl. No.: 16/618,327

(22) PCT Filed: May 30, 2018

(86) PCT No.: PCT/KR2018/006162
§ 371 (c)(1),
(2) Date: Nov. 29, 2019

(87) PCT Pub. No.: WO2018/221962
PCT Pub. Date: Dec. 6, 2018

(65) Prior Publication Data
US 2021/0153519 A1    May 27, 2021

(30) Foreign Application Priority Data

May 31, 2017   (KR) .......................... 10-2017-0067872

(51) Int. Cl.
| | | |
|---|---|---|
| A23D 9/04 | (2006.01) | |
| A23L 5/10 | (2016.01) | |
| A23D 9/007 | (2006.01) | |
| C11B 1/04 | (2006.01) | |
| C11B 1/10 | (2006.01) | |
| C11B 3/00 | (2006.01) | |

(52) U.S. Cl.
CPC .............. *A23D 9/04* (2013.01); *A23D 9/007* (2013.01); *A23L 5/15* (2016.08); *C11B 1/04* (2013.01); *C11B 1/10* (2013.01); *C11B 3/008* (2013.01); *A23V 2002/00* (2013.01)

(58) Field of Classification Search
CPC .. A23D 9/04; A23D 9/007; A23D 9/02; A23L 5/15; C11B 1/04; C11B 1/10; C11B 3/008; A23V 2002/00; A23V 2250/21; A23V 2250/50; A23V 2300/24; A23V 2300/31
See application file for complete search history.

(56) References Cited

U.S. PATENT DOCUMENTS 8,084,071 B2 * 12/2011 Miyake ..................... C11B 3/10
426/601

FOREIGN PATENT DOCUMENTS

| EP | 1902626 A1 | 3/2008 | |
|---|---|---|---|
| JP | H01135892 A | 5/1989 | |
| JP | H05140583 A | 6/1993 | |
| JP | 2004-043584 A | 2/2004 | |
| JP | 2006-075117 A | 3/2006 | |
| JP | 4648199 B | 1/2008 | |
| JP | 2008-156509 A | 7/2008 | |
| JP | 4648199 B2 * | 3/2011 | ............. A23D 9/007 |
| KR | 10-2007-0002919 A | 1/2007 | |
| KR | 10-2015-0112918 A | 10/2015 | |
| KR | 10-2017-0019887 A | 2/2017 | |
| KR | 20170019887 A * | 2/2017 | ............... A23D 9/02 |

OTHER PUBLICATIONS

Machine translation of JP 4648199, U.S. Pat. No. 8,084,071—English Patent.*
Extended European Search Report from European Application No. 18810108.3, dated Mar. 11, 2020.
International Search Report from International Application No. PCT/KR2018/006162, dated Sep. 10, 2018.
Written Opinion from International Application No. PCT/KR2018/006162, dated Sep. 10, 2018.
"[Gangnam Sesame Oil] Coen Bucket Manufacturing Process" Naver blog, Oct. 27, 2013, 11 pages.

* cited by examiner

*Primary Examiner* — Deborah D Carr
(74) *Attorney, Agent, or Firm* — Merchant & Gould P.C.

(57) ABSTRACT

The present invention relates to a method for manufacturing cooking oil, and cooking oil and food manufactured using the same, wherein the manufacturing method includes a) roasting a vegetable raw material by far infrared rays, b) expressing the roasted vegetable raw material to obtain an oil or fat composition containing a first active ingredient, c) obtaining an extract containing a second active ingredient from a residue of the vegetable raw material remaining after the oil or fat composition is expressed, and d) mixing the oil or fat composition with the extract.

4 Claims, No Drawings

METHOD FOR MANUFACTURING EDIBLE OIL, AND EDIBLE OIL AND FOOD EACH MANUFACTURED USING SAME

This application is a National Stage Application of PCT/KR2018/006162, filed May 30, 2018, which claims benefit of Serial No. 10-2017-0097872, filed May 31, 2017 in the Republic of Korea and which applications are incorporated herein by reference. To the extent appropriate, a claim of priority is made to each of the above disclosed applications.

TECHNICAL FIELD

The present invention relates to a method for manufacturing cooking oil used for cooking various dishes, and to cooking oil and food manufactured using the same.

BACKGROUND ART

Various liquid cooking oils are used for cooking a variety of foods. Typical cooking oils include corn oil, soybean oil, olive oil, shorting oil, sesame oil, wild sesame oil, palm oil, sunflower oil, and the like. According to the unique flavor thereof and the taste of a user, these cooking oils are used in raw vegetable dishes, stews, deep-fried dishes, stir-fried dishes, and the like.

One of the methods for manufacturing such cooking oil includes a roasting step of introducing a vegetable raw material into a roaster and roasting the vegetable raw material at a high temperature and a expressing step of compressing the vegetable raw material to express the same.

However, when the vegetable raw material is roasted in the roasting step, there is a problem in that polycyclic aromatic hydrocarbons (PAHs) are generated. Particularly, benzopyrene, which is one of the polycyclic aromatic hydrocarbons, is a substance produced by carbonization caused by incomplete combustion of carbohydrates, fats, and proteins, which are the main components of food, when the food is cooked at high temperatures.

Accordingly, there has been proposed a method in which temperature is lowered or a forced exhaust is performed in the roasting step to reduce benzopyrene. However, cooking oil manufactured through the method has a disadvantage in that the unique taste, flavor, and the like thereof may not be obtained or the color thereof becomes dark.

Meanwhile, in order to increase the storage stability of cooking oil and the usefulness thereof to a human body, there have been attempts made to manufacture cooking oil having a high content of active ingredients by increasing the extraction rate of the active ingredients contained in a vegetable raw material during the manufacturing of the cooking oil. As an example thereof, there is a technique for manufacturing sesame oil having a high content of lignan component by applying a supercritical fluid extraction method to increase the extraction rate of a lignan component, which is an active ingredient in sesame, which is one of vegetable materials.

However, there is still a limit in manufacturing the above described cooking oil having a high content of active ingredients.

(Patent Document 1) Korean Patent Laid-Open Publication No. 2015-0112918

DISCLOSURE OF THE INVENTION

Technical Problem

An aspect of the present invention provides a method for manufacturing cooking oil containing a high content of active ingredient while not containing a polycyclic aromatic hydrocarbon compound, and cooking oil and food manufactured using the same.

Technical Solution

According to an aspect of the present invention, there is provided a method for manufacturing cooking oil, the method includes a) roasting a vegetable raw material by far infrared rays, b) expressing the roasted vegetable raw material to obtain an oil or fat composition containing a first active ingredient, c) obtaining an extract containing a second active ingredient from a residue of the vegetable raw material remaining after the expression, and d) mixing the oil or fat composition with the extract.

The step a) may include a-1) introducing the vegetable raw material into a far infrared roaster and irradiating the vegetable raw material with far infrared rays until the temperature inside the far infrared roaster reaches a temperature range of 80-100° C. to remove moisture contained in the vegetable raw material, a-2) performing primary roasting of irradiating the vegetable raw material with far infrared rays until the temperature inside the far infrared roaster reaches a temperature range of 130-150° C. to roast the vegetable raw material from which moisture has been removed, and a-3) performing secondary roasting of irradiating the vegetable raw material with far infrared rays until the temperature inside the far infrared roaster reaches a temperature range of 140-160° C. to roast the vegetable raw material which has been subjected to the primary roasting.

The step c) may include c-1) adding an extraction solvent to the residue of the vegetable raw material to obtain a mixture, c-2) filtering the mixture to obtain a filtrate, and c-3) concentrating the filtrate.

In the step c-1), the residue of the vegetable raw material may be heat-treated before the extraction solvent is added thereto.

The temperature at which the residue of the vegetable raw material is heat-treated may be 150-250° C.

The step c-3) may be concentrating the filtrate by evaporating the extraction solvent at a temperature of 60-80° C.

The extraction solvent may be ethanol or water.

The vegetable raw material may include at least one selected from the group consisting of sesame, wild sesame, black sesame, soybeans, pine nuts, pumpkin seeds, lotus seeds, sunflower seeds, mulberry seeds, brown rice, peanuts, evening primrose seeds, rape seed, and walnuts.

The vegetable raw material may be sesame, and the first active ingredient and the second active ingredient may each be a lignan-based compound.

The lignan-based compound may include at least one selected from the group consisting of sesamin, episesamin, sesamolin, sesamol, sesamolinol, sesaminol, and episameminol.

The method for manufacturing cooking oil of the present invention may further include e) filtering the oil or fat composition with filter paper containing pulp before mixing the oil or fat composition with the extract.

Advantageous Effects

As cooking oil is manufactured as described above, the present invention may provide cooking oil containing a high content of active ingredient while not containing a polycyclic aromatic hydrocarbon compound (for example, benzopyrene) and maintaining the unique taste and flavor of cooking oil.

BEST MODE FOR CARRYING OUT THE INVENTION

Hereinafter, the present invention will be described.

The present invention is characterized by manufacturing cooking oil using far infrared rays when roasting a vegetable raw material and mixing an extract obtained from a residue of the vegetable raw material with an oil or fat composition. The detailed description of the present invention is as follows.

a) Roasting Vegetable Raw Material

A vegetable raw material is roasted with far infrared rays. Specifically, the vegetable raw material is introduced into a far infrared roaster and roasted. The far infrared roaster is a highly efficient roasting apparatus having a transmittance of 80% or greater of far infrared rays, and is provided with a control unit which can be programmed separately for the appropriate rotation speed and time for each temperature interval. As the vegetable raw material is roasted using the far infrared roaster as described above, the present invention may minimize the generation of a hazardous substance such as a polycyclic aromatic hydrocarbon compound (for example, benzopyrene) during roasting compared to the prior art.

That is, typically, since a vegetable raw material is put into a roasting pot made of an iron plate and roasted so that heat is directly transferred to the vegetable raw material, even though the vegetable raw material is roasted at a low temperature, a fine carbonization point is generated on the surface of the vegetable raw material in the process of cooking the vegetable raw material to the inside, which serves as a factor to generate a polycyclic aromatic hydrocarbon compound, which is a hazardous substance.

However, in the present invention, a vegetable raw material is roasted using far infrared rays, so that the vegetable raw material may be evenly cooked from the surface to the inside thereof while being prevented from being carbonized.

The vegetable raw material is not particularly limited, but may include at least one selected from the group consisting of sesame, wild sesame, black sesame, soybeans, pine nuts, pumpkin seeds, lotus seeds, sunflower seeds, mulberry seeds, brown rice, peanuts, evening primrose seeds, rape seed, and walnuts.

The vegetable raw material may be further subjected to a washing step before being introduced into a far infrared roaster, the step of sorting and removing foreign materials. Specifically, the washing step may be performed by sorting a foreign material contained in the vegetable raw material using specific gravity and then rinse the foreign material off the vegetable raw material using tap water and the like. The washing step may be performed by repeating one or more times (specifically 1-3 times) according to the amount of foreign materials such as stones, sand, and the like, which are separated from the vegetable raw material.

The step of roasting of a vegetable raw material using a far infrared roaster (a) may be embodied by, while rotating a far infrared roaster, a-1) introducing the vegetable raw material into a far infrared roaster and irradiating the vegetable raw material with far infrared rays until the temperature inside the far infrared roaster reaches a temperature range of 80-100° C. to remove moisture contained in the vegetable raw material, a-2) performing primary roasting of irradiating the vegetable raw material with far infrared rays until the temperature inside the far infrared roaster reaches a temperature range of 130-150° C. to roast the vegetable raw material from which moisture has been removed, and a-3) performing secondary roasting of irradiating the vegetable raw material with far infrared rays until the temperature inside the far infrared roaster reaches a temperature range of 140-160° C. to roast the vegetable raw material which has been subjected to the primary roasting.

The removing of moisture (a-1) is preferably performed by, while irradiating the vegetable raw material with far infrared rays for 5-15 minutes until the temperature inside the far infrared roaster reaches a temperature range of 80-100° C., repeating high-speed rotation of the far infrared roaster at 40-60 Hz for about 2-7 seconds and low-speed rotation of the same at 15-25 Hz for about 15-20 seconds. This is because as the high-speed rotation and the low-speed rotation are repeated under the above conditions, far infrared rays are irradiated evenly on the whole vegetable raw material and the removal of moisture is efficiently achieved.

The primary roasting (a-2) is a step in which a first popup occurs. It is preferable that the step is performed by, while irradiating the vegetable raw material with far infrared rays for 5-20 minutes until the temperature inside the far infrared roaster reaches a temperature range of 130-150° C., sequentially repeating high-speed rotation of the far infrared roaster at 40-60 Hz for about 2-7 seconds and low-speed rotation of the same at 15-25 Hz for about 15-20 seconds 20 times or more. This is because as the high-speed rotation and the low-speed rotation are repeated under the above conditions, the first popup evenly occurs, and the vegetable raw material may be evenly roasted while being prevented from being carbonized.

The secondary roasting (a-3) is a step in which a second popup occurs. It is preferable that the step is performed by, while irradiating the vegetable raw material with far infrared rays for 5-10 minutes until the temperature inside the far infrared roaster reaches a temperature range of 140-160° C., sequentially repeating high-speed rotation of the far infrared roaster at 40-60 Hz for about 4-7 seconds and low-speed rotation of the same at 15-25 Hz for about 15-20 seconds 10 times or more. This is because as the high-speed rotation and the low-speed rotation are repeated under the above conditions, the second popup evenly occurs, and the vegetable raw material may be evenly roasted while being prevented from being carbonized.

Here, when the vegetable raw material is sesame, the secondary roasting (a-3) may be performed by, while irradiating the vegetable raw material with far infrared rays for 5-10 minutes until the temperature inside the far infrared roaster reaches 160° C., sequentially repeating high-speed rotation of the far infrared roaster at 40-60 Hz for about 4-7 seconds and low-speed rotation of the same at 15-25 Hz for about 15-20 seconds 10 times or more.

In addition, when the vegetable raw material is wild sesame, the secondary roasting (a-3) may be performed by, while irradiating the vegetable raw material with far infrared rays for 5-10 minutes until the temperature inside the far infrared roaster reaches 150° C., sequentially repeating high-speed rotation of the far infrared roaster at 40-60 Hz for about 3-7 seconds and low-speed rotation of the same at 15-25 Hz for about 15-20 seconds 5 times or more.

In addition, when the vegetable raw material is black sesame, the secondary roasting (a-3) may be performed by, while irradiating the vegetable raw material with far infrared rays for 5-10 minutes until the temperature inside the far infrared roaster reaches 160° C., sequentially repeating high-speed rotation of the far infrared roaster at 40-60 Hz for about 4-7 seconds and low-speed rotation of the same at 15-25 Hz for about 15-20 seconds 5 times or more.

Meanwhile, the roasting of a vegetable raw material using the far infrared roaster (a) may further include aging the vegetable raw material which has been subjected to the secondary roasting (a-4). The aging step (a-4) is preferable performed by reducing the heat of the far infrared roaster, and then sequentially repeating high-speed rotation of the far infrared roaster at 40-60 Hz for about 2-7 seconds and low-speed rotation of the same at 15-25 Hz for about 15-20 seconds 10 times or more. This is because as the vegetable raw material which has been subjected to the secondary roasting is aged under the above conditions, the taste and aroma of cooking oil finally manufactured may be maintained for a longer period of time.

The above aging step (a-4) may be performed while the initial temperature of the vegetable raw material which has been subjected to the secondary roasting drops by 5-10% or less.

The vegetable raw material roasted through the above process is preferably discharged from the far infrared roaster within a short period of time (for example, within 10 seconds) while rotating the far infrared roaster at a high speed (for example, 40-60 Hz). This is because as the vegetable raw material is discharged from the far infrared roaster within a short period of time, the surface carbonization of the vegetable raw material is minimized by the residual heat of the far infrared roaster, thereby preventing the taste and aroma of cooking oil finally manufactured from being deteriorated.

Thereafter, the vegetable raw material discharged from the far infrared roaster may be further subjected to a step of being naturally cooled at room temperature before going through the process of obtaining an oil or fat composition (b) to be described below.

b) Obtaining Oil or Fat Composition

The vegetable raw material which has been subjected to the roasting process is expressed to obtain an oil or fat composition containing a first active ingredient. The method for expressing the vegetable raw material is not particularly limited, but it is preferable that the expressing is performed using a expressing apparatus applied with a screw-type expeller on which compression heat does not work. Specifically, a press head is heated to a temperature of 180° C. which is the minimum temperature for separating the oil or fat composition from the vegetable raw material, and then the vegetable raw material introduced through the screw is instantaneously compressed by the press head without being exposed to heat to express the vegetable raw material. When the expressing is performed by the above method, the oil or fat composition may be obtained with high efficiency while preventing the carbonization of the vegetable raw material.

The first active ingredient contained in the oil or fat composition is not particularly limited. However, when the vegetable raw material is sesame, the first active ingredient is preferably a lignan-based compound. The lignan-based compound may exhibit efficacy such as lowering blood pressure, lowering blood lipids, inhibiting lipid peroxidation, and enhancing alcohol degradability, as well as antioxidant efficacy in vitro/in vivo. In addition, due to the antioxidant efficacy of the lignan-based compound, the storage stability of cooking oil (for example, sesame oil) may be increased. Specifically, the lignan-based compound may include at least one component selected from the group consisting of sesamin, episesamin, sesamolin, sesamol, sesamolinol, sesaminol, and episesaminol.

Meanwhile, the obtained oil or fat composition may be further subjected to filtering (e) to be described below before being mixed with the extract. The filtering of the oil or fat composition is not particularly limited, but it is preferable that the filtering is performed using filter paper containing pulp.

Specifically, the filter paper may have a thickness of 3.63-3.95 mm, a pass flow rate at 0.5-1 bar of 1300-2500 L/m2 (min), and a bursting strength wet of 50-60 kPad. When the oil or fat composition is filtered with filter paper as described above, it is possible to increase the filtration efficiency (purification efficiency) of the oil or fat composition having strong adhesive properties while removing as much of a vegetable raw material residue that may be contained in the oil or fat composition.

The above filtering step is preferably performed by having a single treatment capacity of up to 200-800 ml and air pressure of 2 atmospheric pressure or lower.

c) Obtaining Extract

An extract containing the second active ingredient is obtained from the residue of the vegetable raw material remaining after the expression. Specifically, when the expressing of the vegetable raw material is completed, a residue of the vegetable raw material remain. In the residue of the vegetable raw material, a large amount of active ingredients are still contained. Accordingly, in order to manufacture cooking oil containing a high content of active ingredients by recycling the residue of the vegetable raw material, the present invention is characterized by obtaining an extract containing the second active ingredient from the residue of the vegetable raw material and mixing the extract with the oil or fat composition to manufacture cooking oil.

The obtaining of an extract containing the second active ingredient from the residue of the vegetable raw material (c) may be embodied by c-1) adding an extraction solvent to the residue of the vegetable raw material to obtain a mixture, c-2) filtering the mixture to obtain a filtrate, and c-3) concentrating the filtrate.

The obtaining of a mixture (c-1) is preferably performed by a process of adding an extraction solvent to the residue of the vegetable raw material and then mixing at 150-300 rpm for 1-3 hours at a temperature of 40-60° C. The extraction solvent is not particularly limited, but is preferably ethanol or water which is harmless to a human body and has high extraction efficiency.

Here, the residue of the vegetable raw material may be heat-treated before being added with the extraction solvent. This is because as the residue of the vegetable raw material is heat-treated, the content rate of the second active ingredient contained in the extract may be increased. The temperature at which the residue of the vegetable raw material is heat-treated is not particularly limited, but is preferably 150-250° C.

The obtaining of the filtrate (c-2) is preferably performed by introducing the mixture in which the residue of the vegetable raw material is mixed with the extraction solvent into a filter and then performing decompression filtration at a pressure of 0.1-1 bar.

The concentrating of the filtrate (c-3) is preferably performed by collecting a supernatant from the obtained filtrate and evaporating the extraction solvent at a temperature of 60-80° C. to concentrate the filtrate.

The second active ingredient contained in the extract obtained by the process as described above may be the same lignan-based compound as the first active ingredient. That is, when the vegetable raw material is sesame, the residue of the vegetable raw material is sesame oil meal, and since the extract is obtained using the sesame oil meal, the second active ingredient may be a lignan-based compound.

d) Mixing

The oil or fat composition and the extract are mixed. Specifically, the oil or fat composition containing the first active ingredient may be added and then mixed with the extract containing the second active ingredient to manufacture cooking oil. As the extract is added and mixed with the oil or fat composition, cooking oil having a high content of active ingredient (the first active ingredient+the second active ingredient) may be efficiently manufactured.

Here, the mixing ratio of the oil or fat composition and the extract is not particularly limited. However, considering the content of the active ingredient (the first active ingredient+the second active ingredient) contained in cooking oil finally manufactured, a weight ratio of 1:0.0001 to 1 is preferred.

The cooking oil of the present invention manufactured by the manufacturing method as described above may be used for various dishes such as sauces, dressings, spreads, seasoned foods and stir-fried foods.

MODE FOR CARRYING OUT THE INVENTION

Hereinafter, the present invention will be described in detail with reference to the following Examples. However, the following Examples are illustrative of the present invention, and the present invention is not limited by the following Examples.

Example 1 a) Roasting Sesame

Impurities such as soil, sand, weeds, twigs, immature sesame grains mixed with stocked sesame were removed, and then the sesame was introduced into water and stirred for 5-15 minutes using a screw and the like to remove impurities such as dirt and empty heads of grain.

Next, the sesame from which impurities had been removed were introduced into a far infrared roaster, and while irradiating the sesame with far infrared rays for 15 minutes until the temperature inside the far infrared roaster reaches 90° C., a process of high-speed rotation of the far infrared roaster at about 50 Hz for about 5 seconds and a process of low-speed rotation of the same at about 20 Hz for about 15 seconds were sequentially repeated for 10 times or more to remove moisture contained in the sesame.

Subsequently, while irradiating the sesame with far infrared rays for 20 minutes until the temperature inside the far infrared roaster reaches 150° C., a process of high-speed rotation of the far infrared roaster at about 50 Hz for about 4 seconds and a process of low-speed rotation of the same at about 20 Hz for about 17 seconds were sequentially repeated for 30 times or more to perform a primary roasting of the sesame.

Next, while irradiating the sesame with far infrared rays for 10 minutes until the temperature inside the far infrared roaster reaches 155° C., a process of high-speed rotation of the far infrared roaster at about 50 Hz for about 6 seconds and a process of low-speed rotation of the same at about 20 Hz for about 17 seconds were sequentially repeated for 10 times or more to perform a secondary roasting of the sesame.

Then, while not irradiating the sesame with far infrared rays, a process of high-speed rotation of the far infrared roaster at about 50 Hz for about 6 seconds and a process of low-speed rotation of the same at about 20 Hz for about 17 seconds were sequentially repeated for 10 times or more to age the sesame roasted two times.

Next, the sesame aged in the far infrared roaster rotating at a high speed of about 50 Hz were taken out within 10 seconds and then the sesame taken out from the far infrared roaster were cooled in a natural cooling manner.

b) Obtaining Oil or Fat Composition

The sesame naturally cooled is introduced into a expressing apparatus applied with a screw-type expeller on which compression heat does not work and then instantaneously compressed by the press head of 180° C. to obtain a sesame oil or fat composition. At this time, the sesame was continuously stirred in the process of introducing the sesame into the expressing apparatus in order to maintain the temperature of the sesame to be constant.

The obtained oil or fat composition was cooled naturally for an hour to a temperature of lower than 40° C., and then filtering was performed using filter paper having a one-time treatment capacity of 200-800 ml and made of pulp and diatomite under the air pressure condition of 2 atmospheric pressure or lower (bottling is performed with the filtering at the same time).

c) Obtaining Extract 400 g of sesame oil meal left after the expressing (temperature: 160° C.) and 1,200 ml of ethanol having a purity of 95% were introduced into a glass container and mixed for 2 hours at 50° C. under the condition of 530 rpm to obtain a mixture.

The obtained mixture was introduced to a filter (filter paper: watman filter paper No 1) to be subjected to decompression filtration to obtain a filtrate. At this time, the filter into which the mixture was introduced was added with additional 400 ml of ethanol having a purity of 95%, and then decompression filtration was performed.

The obtained filtrate was stored for 42 hours at −20° C., and the supernatant of the filtrate was concentrated at 80° C. to obtain 11 g of extract.

d) Mixing of Oil or Fat Composition and Extract

The filtered oil or fat composition and the extracted extract were mixed at a weight ratio of 1:1 to manufacture sesame oil.

Example 2

Sesame oil was manufactured in the same manner as in Example 1 except that sesame oil meal heat-treated at 230° C. in the step of obtaining an extract was used.

Comparative Example 1

CJ CheilJedang's Baeksul lignan sesame oil was purchased and applied.

Comparative Example 2

Sesame oil was manufactured in the same manner as in Example 1 except that the step of obtaining an extract c) and the step of mixing d) were not performed.

Experimental Example 1: Measurement of Active Ingredient 0.1 g of the sesame oil manufactured in each of Examples 1 to 2 and Comparative Examples 1 to 2 was added with 1 ml of n-Haxane and then the mixture was left to stand in a dark room for hours. Thereafter, the mixture was filtered with 0.2 μm syringe filter (National Science) and analyzed with a high performance liquid chromatography (HPLC) apparatus equipped with an ultraviolet detector to measure the content of a lignan-based compound, which is an active ingredient contained in the sesame oil. At this time, the analysis conditions of the HPLC apparatus are shown in Table 1 below, and the measured content of the lignan-based compound is shown in Table 2 below.

TABLE 1

| | |
|---|---|
| Ultraviolet detector | Model L-2400 (Hitachi社, Tokyo, Japan) |
| Analysis wavelength | 280 nm |
| Stationary phase (column) | Athena C18 120 A 4.6 mm × 250 mm 5 μm (CNW technologies) |
| Mobile phase | A solvent: Deionized Water |
| | B solvent: Methanol |

| Time (minute) | A solvent | B solvent |
|---|---|---|
| 0-5 | 95% | 5% |
| 5-10 | 82% | 18% |
| 10-15 | 65% | 35% |
| 15-18 | 38% | 62% |
| 18-22 | 20% | 80% |
| 22-23 | 20% | 80% |
| 23-26 | 95% | 5% |

| | |
|---|---|
| Flow rate | 1.0 mL/min |
| Temperature | 25° C. |

TABLE 2

| Classification | Sesame oil meal temperature (° C.) | Sesamol (mg/g) | Sesamin (mg/g) | Sesamolin (mg/g) | Lignan-based compound Total content (mg/g) |
|---|---|---|---|---|---|
| Example 1 | 160 | 13.35 | 166.38 | 111.53 | 291.26 |
| Example 2 | 230 | 21.44 | 234.9 | 161.12 | 417.46 |
| Comparative Example 1 | — | 0.94 | 5.04 | 2.82 | 8.8 |
| Comparative Example 2 | — | 0.61 | 21.73 | 22.43 | 44.77 |

Referring to Table 2, it can be confirmed that the sesame oil manufactured by the manufacturing method of the present invention has a high content of lignan-based compound which is an active ingredient. These results support that it is possible to manufacture cooking oil having a high content of active ingredients when the cooking oil is manufactured by the manufacturing method of the present invention.

[Experimental Example 2] Analysis of Benzopyrene Content

The content of benzopyrene contained in the sesame oil manufactured in each of Examples 1 to 2 was analyzed by the Korea Food Laboratory, and the results are shown in Table 3 below. At this time, the analysis was applied with a method notified by the Food and Drug Administration. Specifically, benzopyrene in sesame oil was extracted, as an internal standard material, with a mixture of N, N-dimethylformamide and water (9:1), and hexane using 3-methylcholaterene, and purified with a solid phase extraction (SPE) cartridge to be analyzed by a high-speed liquid a chromatograph/fluorescence detector.

TABLE 3

| | Benzopyrene content | Appearance |
|---|---|---|
| Example 1 | Not detected | Brown liquid |
| Example 2 | Not detected | Brown liquid |

Referring to Table 3, it can be confirmed that the sesame oil manufactured by the manufacturing method of the present invention does not contain benzopyrene. The above results meet the benzopyrene standard (2.0 μg/kg or less) in cooking oil announced by the Ministry of Food and Drug Safety and support that the manufacturing method of the present invention has a high industrial use value compared to a typical manufacturing method.

[Experimental Example 3] Sensory Test (Evaluation of Taste and Aroma)

The taste and aroma of the sesame oil manufactured in each of Examples 1 to 2 were evaluated in the following manner, and the results are shown in Table 4 below.

Evaluation method: Ten tasters in their twenties to sixties (two people were randomly selected for each age group: However, the tasters were non-smokers) were provided with the sesame oil of each of Examples 1 to 2 and asked to evaluate whether the sesame oil tasted bitter and had nutty aroma. ○ denotes that 8 or more people were favorable. Δ denotes that 6 or 5 people were favorable. X denotes that 3 or 2 people were favorable.

TABLE 4

| | Aroma | Taste |
|---|---|---|
| Example 1 | ○ | ○ |
| Example 2 | ○ | ○ |

Referring to Table 4, it can be confirmed that the sesame oil manufactured by the manufacturing method of the present invention has excellent taste and aroma.

The invention claimed is:

1. A method for manufacturing cooking oil, the method comprising:
   a-1) introducing the vegetable raw material into a far infrared roaster and irradiating the vegetable raw material with far infrared rays until the temperature inside the far infrared roaster reaches a temperature range of 80-100° C. to remove moisture contained in the vegetable raw material;
   a-2) performing primary roasting of irradiating the vegetable raw material with far infrared rays until the temperature inside the far infrared roaster reaches a temperature range of 130-150° C. to roast the vegetable raw material from which moisture has been removed; and
   a-3) performing secondary roasting of irradiating the vegetable raw material with far infrared rays until the temperature inside the far infrared roaster reaches a temperature range of 140-160° C. to roast the vegetable raw material which has been subjected to the primary roasting;
   b) expressing the double roasted vegetable raw material to obtain an oil or fat composition containing a first active ingredient;
   c) obtaining an extract containing a second active ingredient from a residue of the vegetable raw material remaining after the expression; and
   d) mixing the oil or fat composition with the extract,
   wherein the step c) comprises:
   c-1) adding an extraction solvent to the residue of the vegetable raw material which is heat-treated at 150-250° C. to obtain a mixture;
   c-2) filtering the mixture to obtain a filtrate; and
   c-3) concentrating the filtrate, wherein the step c-3) is concentrating the filtrate by evaporating the extraction solvent at a temperature of 60-80° C., wherein the vegetable raw material is sesame, and the first active ingredient and the second active ingredient are each a lignan-based compound.

2. The method of claim 1, wherein the extraction solvent is ethanol or water.

3. The method of claim 1, further comprising e) filtering the oil or fat composition with filter paper containing pulp before mixing the oil or fat composition with the extract.

4. The method of claim 1, wherein the lignan-based compound comprises at least one selected from the group consisting of sesamin, episesamin, sesamolin, sesamol, sesamolinol, sesaminol, and episameminol.

* * * * *